United States Patent
Murashita et al.

(10) Patent No.: US 8,644,555 B2
(45) Date of Patent: Feb. 4, 2014

(54) DEVICE AND METHOD FOR DETECTING MOVEMENT OF OBJECT

(75) Inventors: Kimitaka Murashita, Kawasaki (JP); Yuri Watanabe, Machida (JP); Koichi Fujimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 180 days.

(21) Appl. No.: 13/232,421

(22) Filed: Sep. 14, 2011

(65) Prior Publication Data

US 2012/0002842 A1 Jan. 5, 2012

Related U.S. Application Data

(63) Continuation of application No. PCT/JP2009/001462, filed on Mar. 30, 2009.

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | | |
|---|---|---|---|
| 4,937,878 A | 6/1990 | Lo et al. | |
| 6,008,866 A | 12/1999 | Komatsu | |
| 6,034,723 A | 3/2000 | Fujimori | |
| 6,507,366 B1 * | 1/2003 | Lee | 348/352 |
| 2003/0112412 A1 * | 6/2003 | Han et al. | 352/44 |
| 2009/0189984 A1 * | 7/2009 | Yamazaki | 348/161 |

FOREIGN PATENT DOCUMENTS

| | | |
|---|---|---|
| JP | 62-26992 | 2/1987 |
| JP | 3-502018 | 5/1991 |
| JP | 6-217188 | 8/1994 |
| JP | 7-322285 | 12/1995 |
| JP | 9-116855 | 5/1997 |
| JP | 10-108039 | 4/1998 |
| JP | 11-242747 | 9/1999 |
| JP | 2003-134385 | 5/2003 |
| JP | 2003-143484 | 5/2003 |
| JP | 2004-343803 | 12/2004 |
| JP | 2005-203880 | 7/2005 |
| JP | 2006-254364 | 9/2006 |
| WO | 90/01706 | 2/1990 |

OTHER PUBLICATIONS

Japanese Office Action issued Aug. 21, 2012 in corresponding Japanese Patent Application No. 2011-508057.
International Search Report for PCT/JP2009/001462, mailed Jun. 30, 2009.
Japanese Office Action issued Oct. 30, 2012 in corresponding Japanese Patent Application No. 2011-508057.

* cited by examiner

*Primary Examiner* — Claire X Wang
(74) *Attorney, Agent, or Firm* — Staas & Halsey LLP

(57) ABSTRACT

A device for detecting a movement of an object includes: an image shooting unit to generate a first image and a second image by continuous shooting; a detection unit to detect a movement region based on a difference between the first and second images; an edge detection unit to detect an edge region in the first image; a deletion unit to delete the edge region from the movement region; and a decision unit to determine a degree of object movement in accordance with the movement region in which a part of the movement region being deleted by the deletion unit.

7 Claims, 21 Drawing Sheets

|  | MOVEMENT REGION BASED ON OBJECT SHAKE | MOVEMENT REGION BASED ON CAMERA SHAKE |
|---|---|---|
| POSITION AT WHICH MOVEMENT REGION APPEARS | REGION CORRESPONDING TO MOVING OBJECT | EDGE PORTION ACROSS ENTIRE IMAGE |
| DEGREE OF MOVEMENT | DEPEND ON POSITIONS (DEPEND ON MAGNITUDE OF OBJECT MOVEMENT) | CONSTANT REGARDLESS OF POSITION (DEPEND ON AMOUNT OF CAMERA SHAKE) |

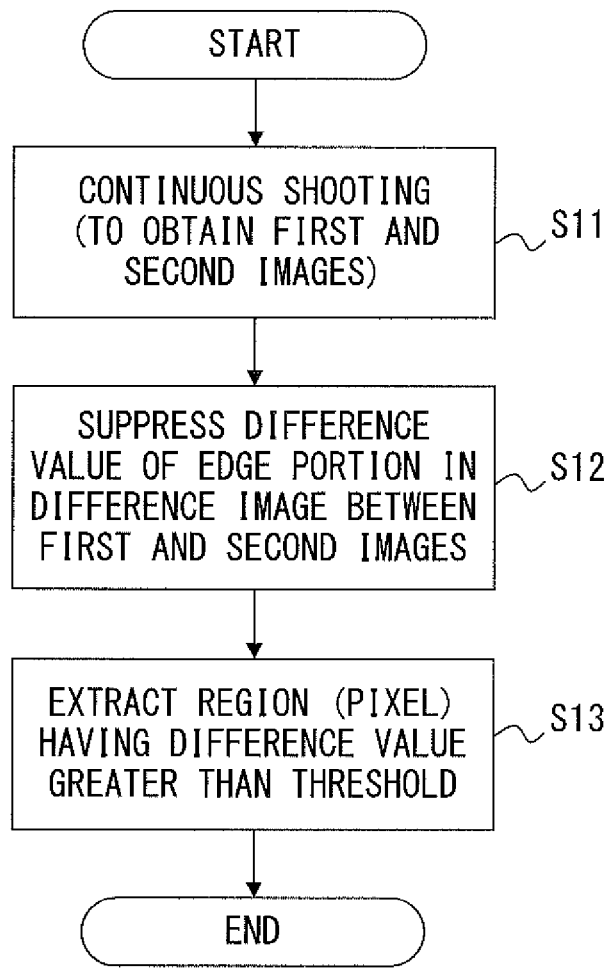
F I G. 3

SMOOTHING FILTER
COEFFICIENT

| 1 | 2 | 1 |
|---|---|---|
| 2 | 4 | 2 |
| 1 | 2 | 1 |

PIXEL VALUE kij AT POSITION (i, j)

$$kij = \{a_{i-1, j-1} + 2a_{i, j-1} + a_{i+1, j-1} \\ + 2a_{i-1, j} + 4a_{i, j} + 2a_{i+1, j} \\ + a_{i-1, j+1} + 2a_{i, j+1} + a_{i+1, j+1}\}/16$$

PIXEL VALUES IN INPUT IMAGE

| $a_{11}$ | $a_{12}$ | $a_{13}$ | $a_{14}$ | $a_{15}$ | ... |
|---|---|---|---|---|---|
| $a_{21}$ | $a_{22}$ | $a_{23}$ | $a_{24}$ | $a_{25}$ | ... |
| $a_{31}$ | $a_{32}$ | $a_{33}$ | $a_{34}$ | $a_{35}$ | ... |
| $a_{41}$ | $a_{42}$ | $a_{43}$ | $a_{44}$ | $a_{45}$ | ... |
| ⋮ | ⋮ | ⋮ | ⋮ | ⋮ | ⋱ |

F I G. 6

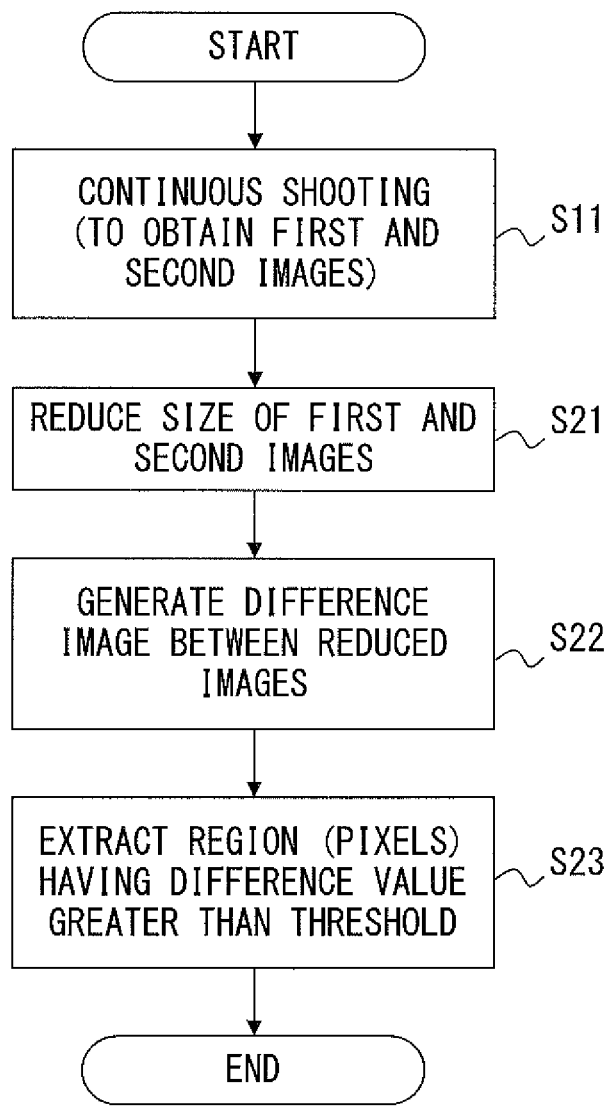
F I G. 8

□ DECISION RESULT = 0 (EQUAL TO OR SMALLER THAN THRESHOLD)
■ DECISION RESULT = 1 (GREATER THAN THRESHOLD)
▨ REGIONS CONVERTED INTO 0 (ZERO)
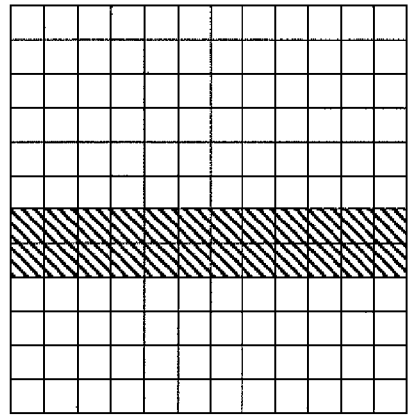
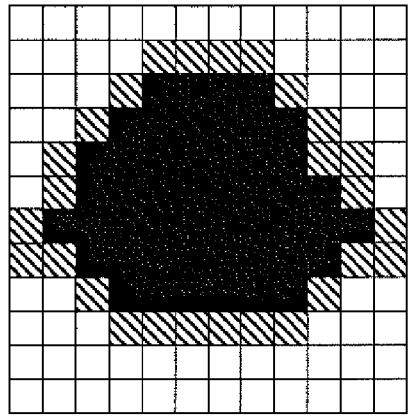
↑ DELETE ONE-PIXEL WIDE AT CIRCUMFERENCE
↑ DELETE ONE-PIXEL WIDE AT CIRCUMFERENCE
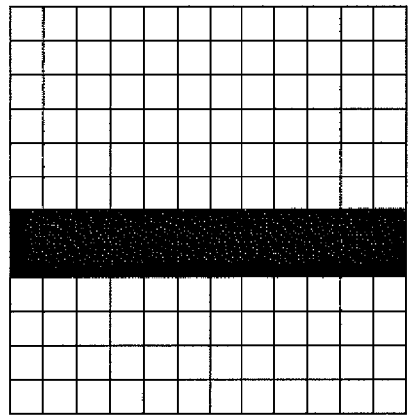
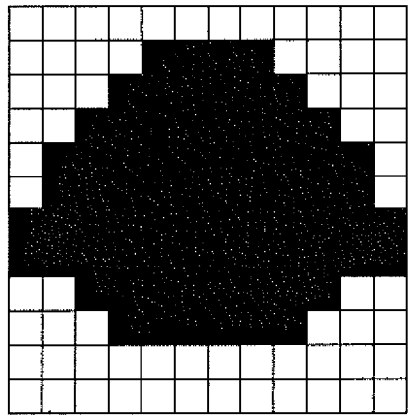
FIG. 10A
FIG. 10B

CIRCUMFERENCE
REMOVING FILTER

| 1 | 1 | 1 |
|---|---|---|
| 1 | 8 | 1 |
| 1 | 1 | 1 |

PIXEL VALUE kij AT POSITION (i, j)

$A = b_{i-1, j-1} + b_{i, j-1} + b_{i+1, j-1}$
$\quad + b_{i-1, j} + 8b_{i, j} + b_{i+1, j}$
$\quad + b_{i-1, j+1} + b_{i, j+1} + b_{i+1, j-1}$
$if(A \geq Th) \quad kij = 1$
$else \quad kij = 0$

BINARIZED DIFFERENCE VALUES
IN DIFFERNCE IMAGE

| $b_{11}$ | $b_{12}$ | $b_{13}$ | $b_{14}$ | $b_{15}$ | ... |
|---|---|---|---|---|---|
| $b_{21}$ | $b_{22}$ | $b_{23}$ | $b_{24}$ | $b_{25}$ | ... |
| $b_{31}$ | $b_{32}$ | $b_{33}$ | $b_{34}$ | $b_{35}$ | ... |
| $b_{41}$ | $b_{42}$ | $b_{43}$ | $b_{44}$ | $b_{45}$ | ... |
| ⋮ | ⋮ | ⋮ | ⋮ | ⋮ | ⋱ |

FIG. 11

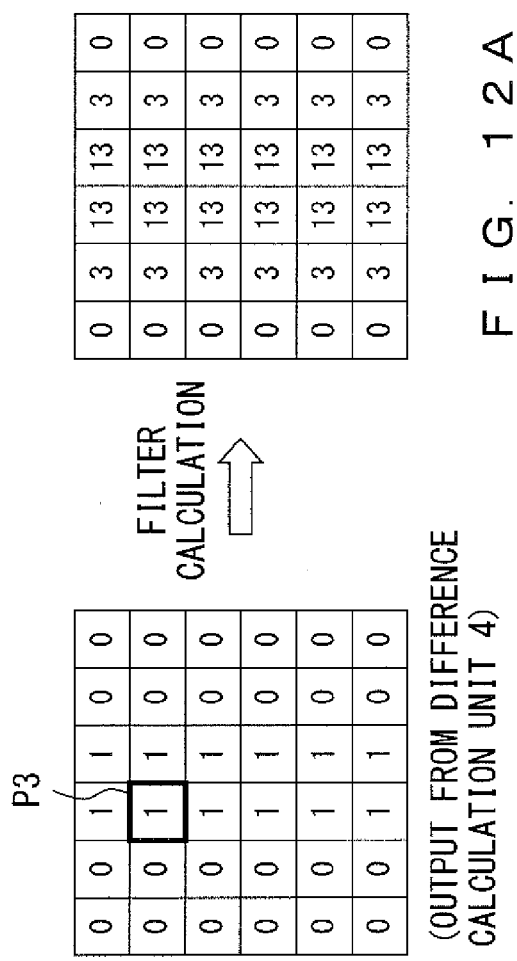
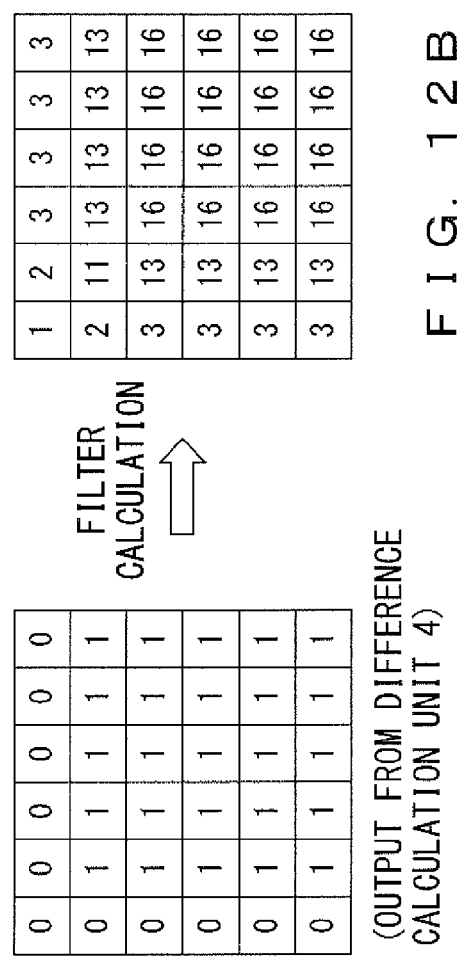
FIG. 12A
FIG. 12B

LAPLACIAN FILTER
COEFFICIENT

| 1 | 1 | 1 |
|---|---|---|
| 1 | -8 | 1 |
| 1 | 1 | 1 |

PIXEL VALUE kij AT POSITION (i, j)

$kij = a_{i-1,j-1} + a_{i,j-1} + a_{i+1,j-1}$
$\quad + a_{i-1,j} - 8a_{i,j} + a_{i+1,j}$
$\quad + a_{i-1,j+1} + a_{i,j+1} + a_{i+1,j+1}$

PIXEL VALUES OF INPUT IMAGE

| $a_{11}$ | $a_{12}$ | $a_{13}$ | $a_{14}$ | $a_{15}$ | ... |
|---|---|---|---|---|---|
| $a_{21}$ | $a_{22}$ | $a_{23}$ | $a_{24}$ | $a_{25}$ | ... |
| $a_{31}$ | $a_{32}$ | $a_{33}$ | $a_{34}$ | $a_{35}$ | ... |
| $a_{41}$ | $a_{42}$ | $a_{43}$ | $a_{44}$ | $a_{45}$ | ... |
| ⋮ | ⋮ | ⋮ | ⋮ | ⋮ | ⋱ |

F I G. 1 4

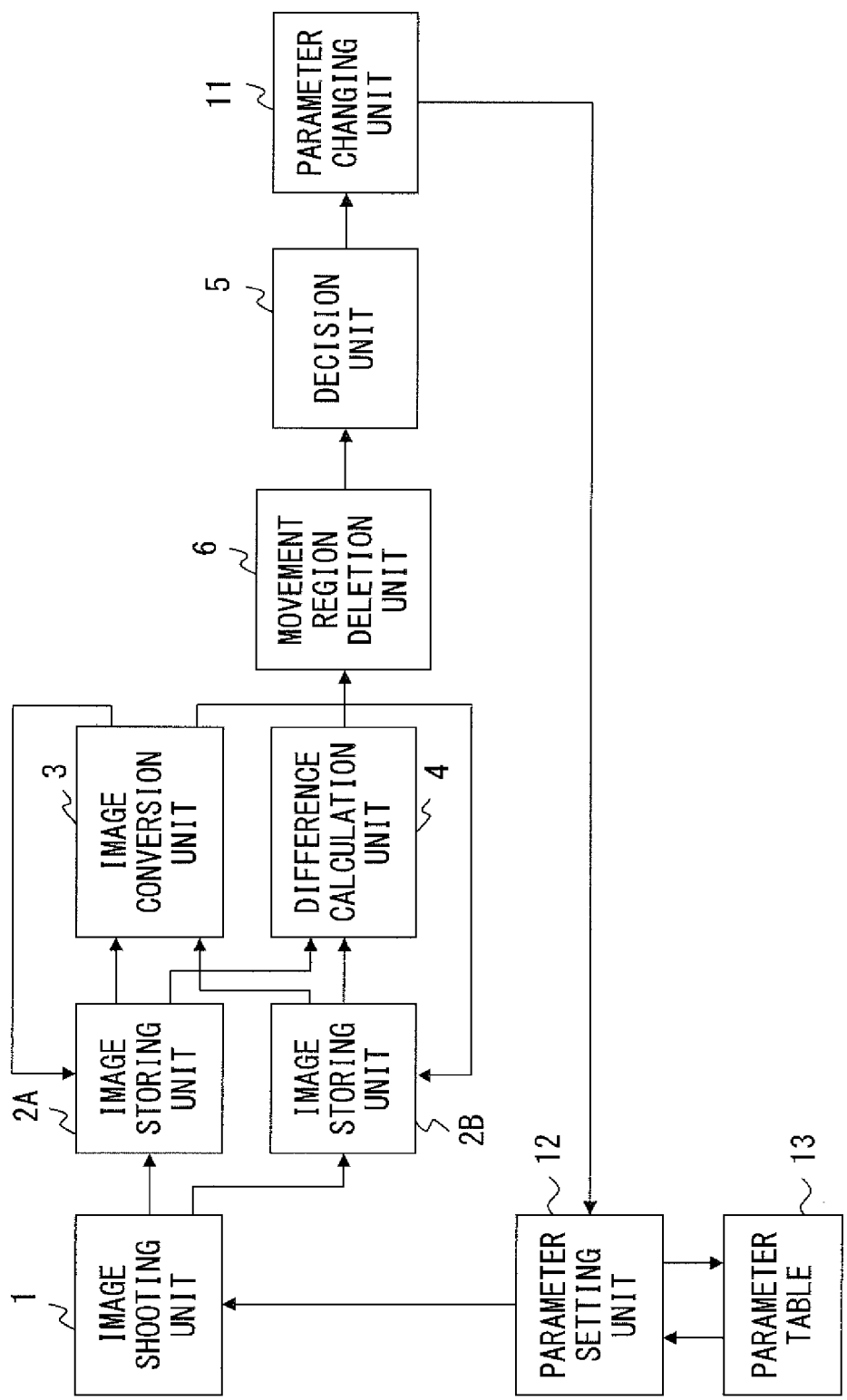
F I G. 1 9

DEVICE AND METHOD FOR DETECTING MOVEMENT OF OBJECT

CROSS-REFERENCE TO RELATED APPLICATION

This application is a continuation of an international application PCT/JP2009/001462, which was filed on Mar. 30, 2009.

FIELD

The present invention is related to a device and a method for detecting a movement of an object by utilizing a digital image, and is applicable to, for example, a digital camera or an electronic camera.

BACKGROUND

Digital images obtained by digital cameras (or electronic cameras) may be influenced by camera shake and object shake. Camera shake occurs when a camera itself moves while an image is being shot. Object shake occurs when an object moves while an image is being shot. In order to improve the quality of images shot by a camera, it is desirable to correct both camera shake and object shake.

As techniques for correcting camera shake, optical correction and electronic correction are known. Optical correction is realized by controlling the position of a lens or a sensor (CMOS sensor or CCD sensor, etc.) in response to movements of the camera while images are being shot. Also, if the exposure time for shooting images is reduced, camera shake is suppressed. However, a short exposure time may lead to underexposure, which deteriorates image quality. Accordingly, in electronic correction, a plurality of images are obtained by continuous shooting, and such images are synthesized after alignment of the images. This suppresses the influence of underexposure. For alignment between images, KLT and a Moravec operator can for example be used.

Object shake may also be suppressed by reducing exposure time for shooting images. Accordingly, correction of object shake is realized by controlling exposure time in response to the degree of movements of objects. For example, when the degree of object movement is high (in other words, when the area within which the object moves in the image is large), the exposure time is controlled to be short. In this correction, movements of the object are calculated in accordance with, for example, an image shot in preliminary shooting that is performed immediately before the actual shooting. In addition, image deterioration caused by underexposure may be suppressed by image synthesis, similarly to the case of camera shake correction, or may also be suppressed by image processing techniques such as a noise removing process.

It is possible to calculate a movement of an object by utilizing a plurality of images obtained by continuous shooting. However, images obtained by shooting may involve camera shake components. Accordingly, if images obtained by shooting are to be utilized to detect movements of an object, camera shake components have to be removed. Thus, methods in which movements of an object are detected by removing camera shake components have been proposed.

In the first method, camera shake is suppressed by optical correction. In this case, differences between a plurality of images obtained by continuous shooting are calculated, and thereby movements of the object are detected.

In the second method, an image motion vector detection device includes a circuit to detect the vector of camera shake from image signals obtained by a video camera. The vector expressing the movement of the object is detected based on such image signals and the vector of the camera shake (see Japanese Laid-open Patent Publication No. 6-217188 for example).

Other methods for detecting movements of an object are disclosed by, for example, Japanese Laid-open Patent Publication No. 2003-134385, Japanese Laid-open Patent Publication No. 2003-143484, and Japanese Laid-open Patent Publication No. 2006-254364. Also, Japanese Laid-open Patent Publication No. 9-116855 and Japanese Laid-open Patent Publication No. 2005-203880 disclose arts related to the present application.

However, the first method requires an optical camera shake correction mechanism in a camera. Thus, the use of the first method increases the price of cameras. Also, it is not easy to increase shock resistance (or vibration resistance) of an optical camera shake correction mechanism. Accordingly, it is difficult to include an optical camera shake correction mechanism in electronic devices that are required to be shock resistant, such as mobile phones or the like.

When the second method is to be used to correct object shake, it is necessary to calculate, immediately before shooting images that are to be recorded, a movement of the object according to a plurality of images obtained by preliminary shooting, and to determine shooting parameters (such as the exposure time) that correspond to the calculated object movement. If it takes a long processing time to determine such shooting parameters, a difference will occur between the calculated object movement and the movement that the object actually makes when it is shot. In such a case, images are shot with inappropriate shooting parameters, and thus the image quality may deteriorate. Accordingly, when, for example, the shooting capacity of a camera is 30 fps, it is desired to be able to calculate object movement within 1/30 second. However, in the second method, image alignment is performed in order to remove camera shake components. In such a case, image alignment includes procedures of extracting characteristic points, procedures of tracking the extracted characteristic points, or the like, and thus a great deal of calculations have to be performed, making it difficult to perform real-time processing. Accordingly, the second method is not appropriate to correction of object shake.

As has been described above, in the conventional techniques, it has been difficult to appropriately correct object shake by low-cost configurations because detection of object movements requires a great deal of processing.

SUMMARY

According to an aspect of an invention, a device for detecting a movement of an object includes: an image shooting unit to generate a first image and a second image by continuous shooting; a detection unit to detect a movement region based on a difference between the first and second images; an edge detection unit to detect an edge region in the first image; a deletion unit to delete the edge region from the movement region; and a decision unit to determine a degree of object movement in accordance with the movement region in which a part of the movement region being deleted by the deletion unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a flowchart illustrating how to detect object movements according to an embodiment;

FIG. 6 illustrates an example of a filter included in an image conversion unit according to the first embodiment;

FIG. 8 is a flowchart of another operation according to the first embodiment;

FIGS. 10A and 10B explain processes performed by a movement region deletion unit;

FIG. 11 illustrates an example of a filter included in the movement region deletion unit;

FIGS. 12A and 12B explain filter calculations and threshold value decision performed by the movement region deletion unit;

FIG. 14 illustrates an example of a filter used in the procedures illustrated in FIG. 13;

FIG. 19 illustrates a configuration of an object shake suppression device according to an embodiment;

DESCRIPTION OF EMBODIMENTS

In a method for detecting a movement of an object according to an embodiment, two digital images (the first and second images) obtained by continuous shooting are utilized so as to detect the degree of movement of an object.

Figure 1:
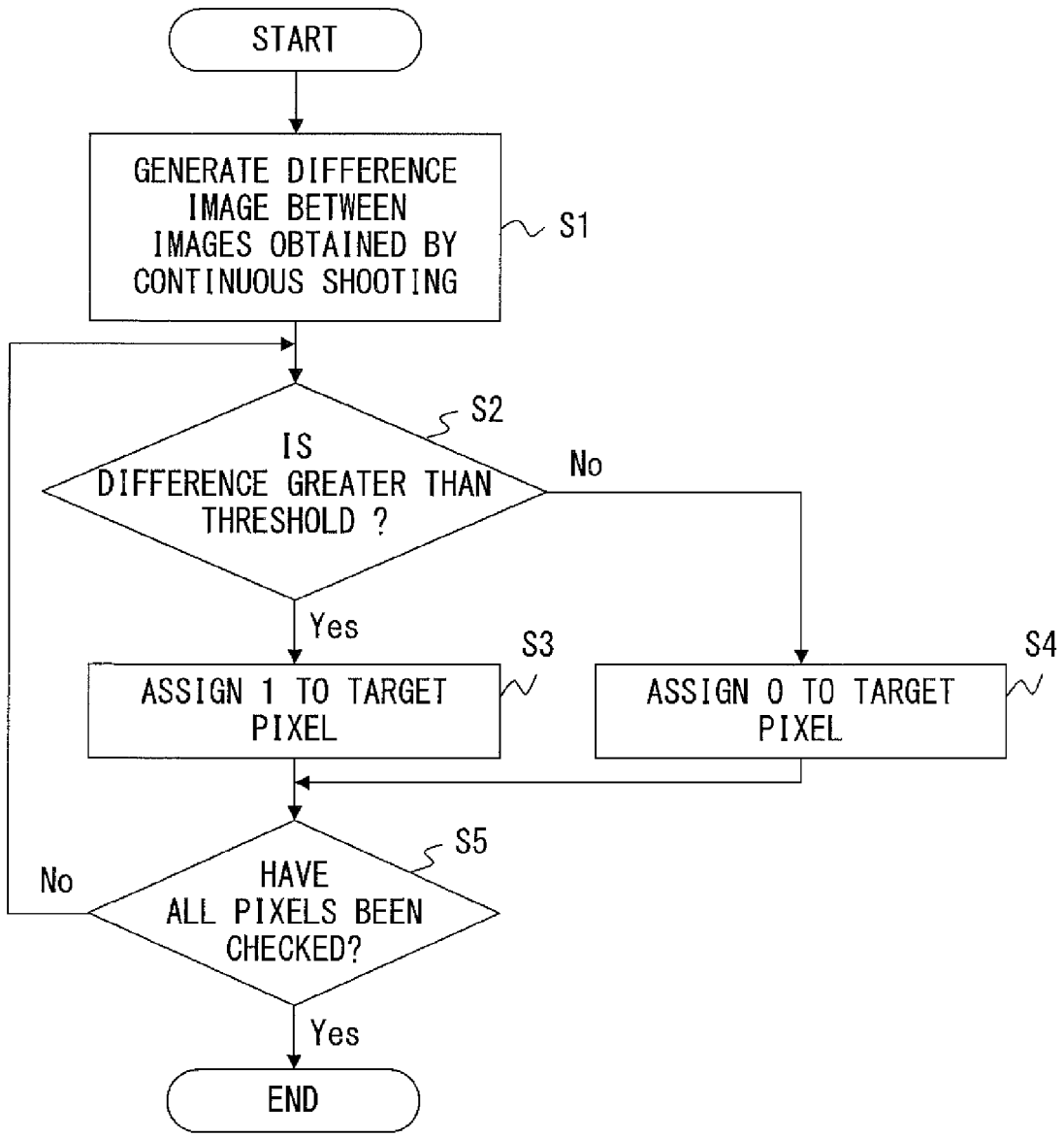
FIG. 1 is a flowchart of detecting a movement region in an image.

FIG. 1 is a flowchart of detecting a movement region in an image by using the first and second images. In this example, it is assumed that the first and second images are generated by continuous shooting.

In step S1, difference values between the first and second images are calculated. Difference values are generated by calculating differences between pixel values at corresponding positions between the first and second images. Pixel values are, for example, information indicating the luminance of each pixel, information indicating the color difference of each pixel, or a combination of them, although the scope of the present invention is not particularly limited to these examples.

Steps S2 through S4 are executed with respect to the difference value of each pixel. In step S2, the difference value between the first and second images is compared with a specified threshold. When the difference value is greater than the threshold, the process proceeds to step S3, and when the difference value is equal to or smaller than the threshold, the process proceeds to step S4. In step S3, "1" is assigned to the target pixel. In step S4, "0" is assigned to the target pixel. An image having a target pixel that has been assigned "1" or "0" as described above is referred to as a difference image. Step S5 is provided so that steps S2 through S4 are executed on all pixels.

As described above, "0" is assigned to a region with little or no change between the first and second images, and "1" is assigned to a region having a pixel value that has changed between the first and second images. In other words, a region to which "1" is assigned represents a region in which "movement" has occurred. Hereinafter, these regions may be referred to as "movement regions". Note that the movement region may include movement region based on camera shake and movement region based on object movement.

Figure 2:
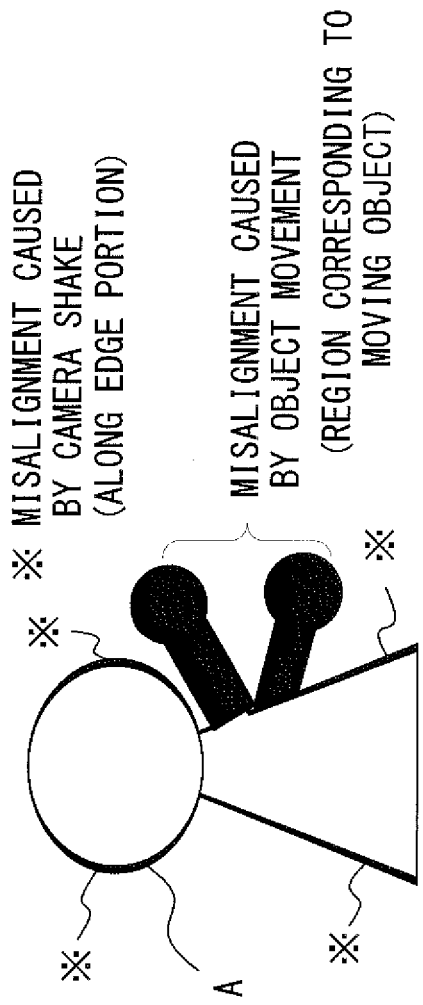
FIG. 2 explains camera shake and object movement.

FIG. 2 explains camera shake and object movement. FIG. 2 illustrates the difference image between first and second images obtained by shooting object A continuously.

In the example illustrated in FIG. 2, a positional misalignment between the first and second images is caused by camera shake (in other words, because the camera moved while the images were being shot). The direction and the magnitude of the positional misalignment caused by the camera shake are almost even across the entire image. Accordingly, movement regions based on camera shake appear along edge portions of the object in the difference image. In FIG. 2, movement regions based on camera shake are appeared along the outline of object A. The widths of movement regions appearing along edge portions depend upon the degree of the camera shake. In other words, the greater the camera shake is, the greater the widths of the edge portions are. However, in shooting under normal conditions, widths of movement regions based on camera shake are at most about 1 or 2 percent of the frame width of the images. Additionally, when the camera has moved in the horizontal direction, the widths of movement regions appearing along outlines stretching in the horizontal or substantially horizontal directions are narrow. Similarly, when the camera has moved in the vertical direction, the widths of movement regions appearing along outlines stretching in the vertical or substantially vertical directions are narrow.

Also, in this example, a movement region appears in the difference image between the first and second images because object A moved while the images were being shot. In FIG. 2, object A is a human, and he/she moved his/her hands while he/she was being shot by a camera. Thus, the regions corresponding to his/her hands are obtained as the movement regions. The movement regions are colored in black in FIG. 2.

The table in FIG. 2 represents characteristics of the movement region based on camera shake and object movement. Movement regions based on object movement appear in a region corresponding to an object that moved when the image is being shot. On the other hand, influence of camera shake may appear across the entire image. However, movement regions based on camera shake appear along edge portions in the image. The degree of movement caused by object movement depends on position in the image, while the degree of movement caused by camera shake is constant regardless of position in the image. The size of movement region based on object movement depends upon the area of the object that moves while the image is being shot. By contrast, the size (widths) of movement region based on camera shake depends upon the degree of camera shake.

As described above, a movement region extracted from a difference image appears based on camera shake and object movements. Thus, when camera-shake-based movement regions are deleted from a movement region in a difference image, it is possible to detect object movements. As has been described above, movement regions based on camera shake appear along edge portions in an image. Accordingly, in a method for detecting movements of an object according to an embodiment, by deleting (or suppressing) a movement region along an edge portion from a movement region, a movement region based on object movement is detected.

FIG. 3 is a flowchart explaining how to detect object movements according to an embodiment. In step S11, images are obtained by continuous shooting. In this embodiment, the first and second images are generated. In step S12, a difference value of an edge portion is reduced or suppressed in the difference image of the first and second images. Step S12 is implemented by, for example, an arbitrary one of the three methods below, although the scope of the present invention is not limited to them.

(1) After processing the original images (i.e., the first and second images), the difference image is generated based on those processed original images (first embodiment).
(2) The difference image is processed (second embodiment).
(3) The difference image is processed utilizing the original image(s) (third embodiment).

In step S13, a region (or a pixel) whose difference value is greater than a specified threshold in the image obtained in step S12 is extracted. Thereafter, the degree of the object movement is determined according to the area of the extracted region (or the number of extracted pixels).

First Embodiment

Figure 4:
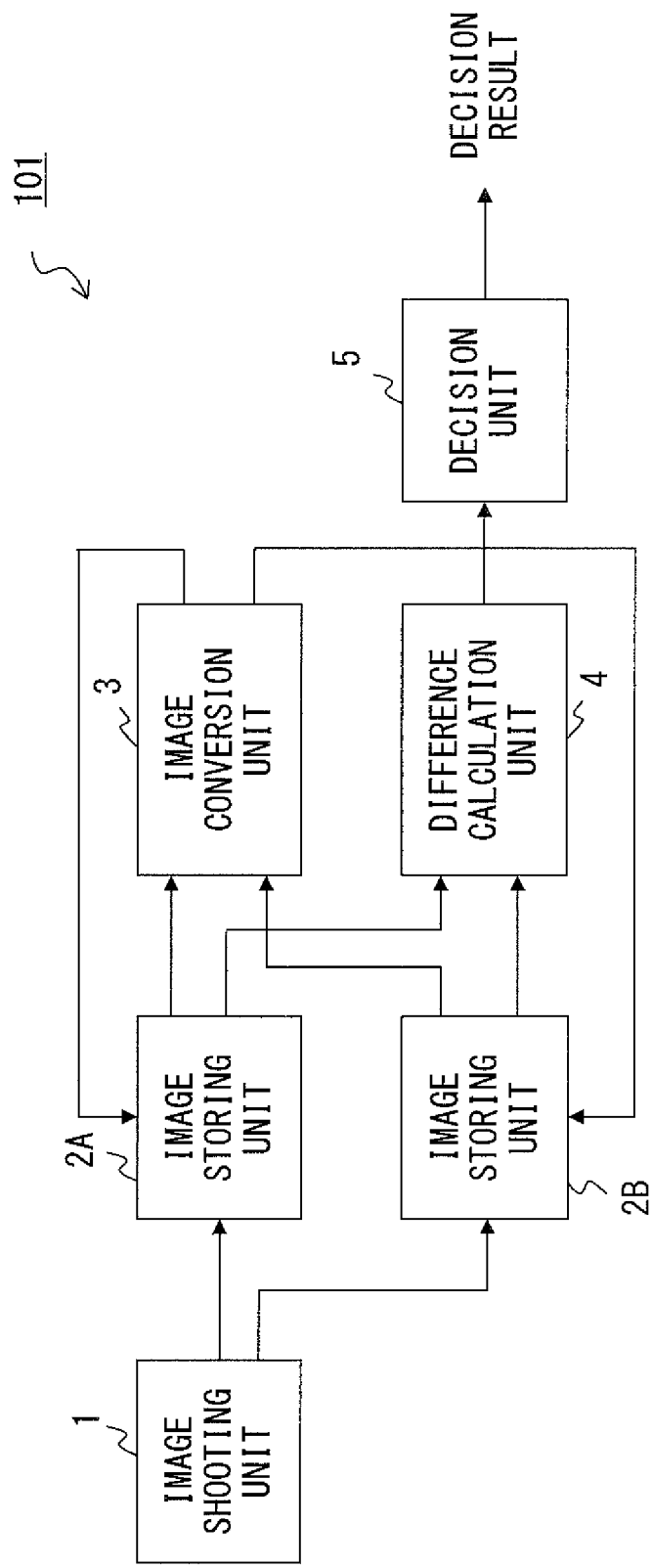
FIG. 4 illustrates a configuration of an object movement detection device according to a first embodiment.

FIG. 4 illustrates a configuration of an object movement detection device according to a first embodiment. An object movement detection device 101 according to the first embodiment includes an image shooting unit 1, image storing units 2A and 2B, an image conversion unit 3, a difference calculation unit 4, and a decision unit 5. The object movement detection device 101 is implemented in, for example, a digital camera.

The image shooting unit 1 is configured to include, for example, a CMOS image sensor or a CCD image sensor, and generates a digital image. The image shooting unit 1 has a function of continuous shooting, and is capable of generating digital images at specified time intervals (10 fps or higher for example). Also, the image shooting unit 1 is capable of generating digital images at the above described time intervals continuously even when the shutter button is not pressed. Hereinafter, this operation mode is also referred to as "preliminary shooting".

The image storing units 2A and 2B store images obtained by the image shooting unit 1, respectively. In this example, when the image shooting unit 1 performs continuous shooting (or preliminary shooting), generated digital images are written to the image storing units 2A and 2B alternately. The image storing units 2A and 2B may be realized by, for example, semiconductor memory. In the examples below, images stored in the image storing units 2A and 2B are also referred to as a first image and a second image, respectively.

The image conversion unit 3 performs specified calculations in order to convert the first and second images stored in the image storing units 2A and 2B. Thereafter, the first and second images converted by the image conversion unit 3 are stored in the image storing units 2A and 2B again. Image conversion performed by the image conversion unit 3 will be explained later in detail.

The difference calculation unit 4 calculates the difference between the first and second images that have been converted and stored in the image storing units 2A and 2B. In other words, the difference calculation unit 4 generates a difference image between the converted first image and the converted second image. The difference image is generated by calculating differences in pixel values at the corresponding positions between two images.

The difference calculation unit 4 also performs, on the converted first and second images, processes in steps S2 through S4 in the flowchart illustrated in FIG. 1. Thus, among difference values between the converted first and second images, a region having a difference in pixel values greater than a specified threshold is assigned "1: movement region", and a region having a difference in pixel values equal to or smaller than the threshold is assigned "0: non-movement region".

The decision unit 5 detects movements of an object based on the movement region extracted by the difference calculation unit 4. In this example, the decision unit 5 extracts the degree of the object movement. "Degree of object movement" is determined by, for example, the area of the movement region or the ratio of the area of the movement region to the area of the entire image. The area of a movement region is expressed, for example, by the number of pixels that are assigned "1". Additionally, "degree of object movement" may be defined, for example, by two levels (large or small), or may be defined by three or more levels.

Figures 5A, 5B:
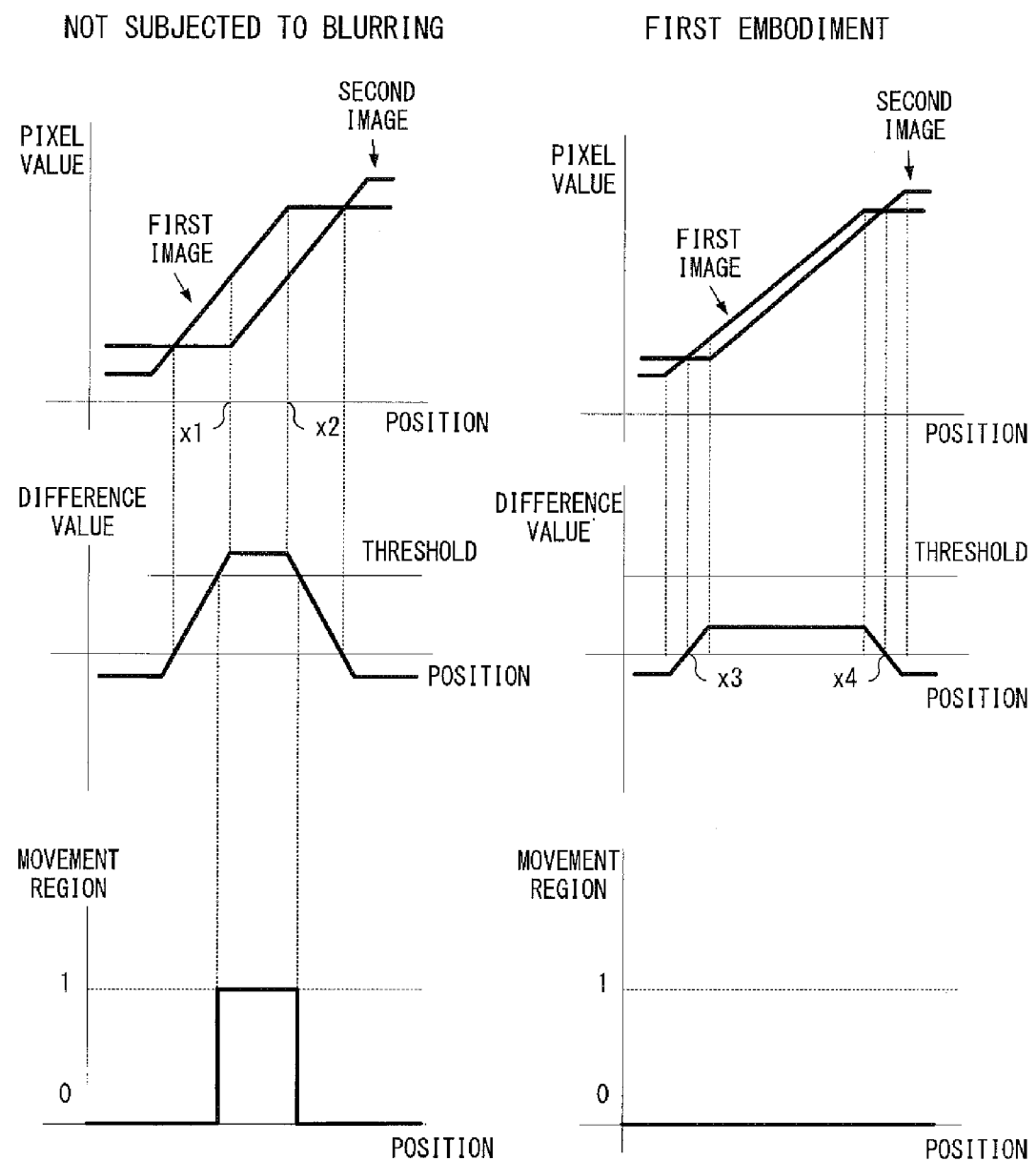
FIG. 5A and FIG. 5B illustrate processes to detect a movement region in the first embodiment.

FIG. 5A and FIG. 5B illustrate processes to detect a movement region in the first embodiment. In FIG. 5A and FIG. 5B, same edge portion in the first and second images are drawn. Also, the edge portions are slightly out of alignment between the first and second images because of camera shake in this example.

FIG. 5A illustrates processes to be executed when the image conversion unit 3 is not used. That is, in FIG. 5A, difference between original first and second images are calculated. In this case, along the edge portions, differences in pixel values are large. In this example, along the edge portions, calculated difference values are greater than the threshold. Accordingly, when the process of the flowchart illustrated in FIG. 1 is executed, "1: movement region" is assigned to regions between x1 and x2. In other words, movement region is detected along the edge portion.

FIG. 5B illustrates a process to be executed when the image conversion unit 3 of the first embodiment is used. In this example, the image conversion unit 3 performs a blurring process on the first and second images. When the blurring process is executed, the slopes of edges are moderated with respect to position in the first and second images. In other words, the rate at which pixel values change in the edge portions decreases. In such a case, the differences between pixel values at the edge portions become smaller. This means that calculated difference values do not exceed the threshold even in the edge portions. Accordingly, when the process illustrated in FIG. 1 is executed, "0: non-movement region" is assigned to regions between x3 and x4 including the edge portions. In other words, movement region is not detected along the edge portion.

FIG. 6 illustrates an example of a filter included in the image conversion unit 3 according to the first embodiment. The image conversion unit 3 is implemented by a smoothing filter in this example. The smoothing filter is a 3×3 filter in this example. However, the smoothing filter is not limited to this configuration, and may be, for example, a 5×5 filter or the like. Also, filter coefficients are not limited to those used in the example in FIG. 6 either.

Filtered pixel value $k_{i,j}$ at coordinates(i,j) is calculated by the smoothing filter as described below. $a_{i,j}$ represents pixel value at coordinates(i,j) in the original image (input image of the smoothing filter).

$$k_{i,j} = \frac{\left\{\begin{array}{c} a_{i-1,j-1} + 2a_{i,j-1} + a_{i+1,j-1} + 2a_{i-1,j} + \\ 4a_{i,j} + 2a_{i+1,j} + a_{i-1,j+1} + 2a_{i,j+1} + a_{i+1,j+1} \end{array}\right\}}{16}$$

Figure 7:
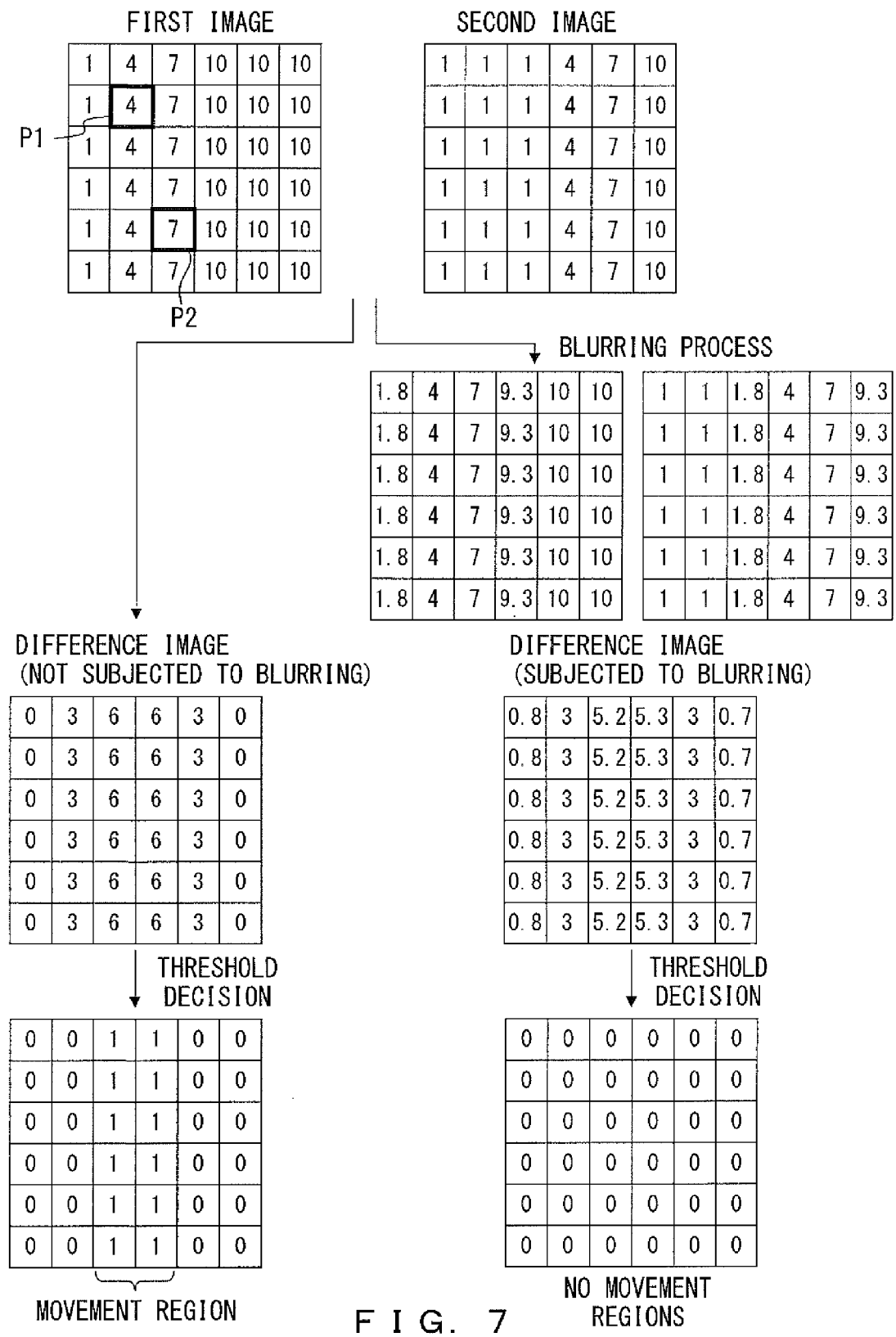
FIG. 7 illustrates a blurring process performed by using a filter.

FIG. 7 illustrates a blurring process performed using the smoothing filter illustrated in FIG. 6. In this example, the original images (the first and second images) have edges (boundary between color regions) running in the vertical direction. In addition, the second image is moved by two pixels with respect to the first image in the horizontal direction.

If the image conversion unit 3 does not perform the blurring process, difference values are generated by calculating differences between respective pixel values of the original first and second images. In such a case, the difference value at the center region is "6" in the example illustrated in FIG. 7. Further, each difference value is compared with the threshold. It is assumed in this example that the threshold is "5.5". Then, the difference image having a movement region (a region assigned "1") extending in the vertical direction through the central region of the image is obtained.

By contrast, in the first embodiment, the image conversion unit 3 performs the blurring process on the first and second images. It is assumed that pixels (not illustrated) outside of the 6×6 regions depicted as the first and second images have the same pixel values as those of the adjacent pixels. In this example, the smoothing filter illustrated in FIG. 6 performs filtering on each pixel value of the first and second images. For example, the filter calculation for pixel P1 of the first image is as below:

P1=(1×1+4×2+7×1+1×2+4×4+7×2+1×1+4×2+7×1)/16=4

Also, the filter calculation for pixel P2 of the first image is as below:

P2=(4×1+7×2+10×1+4×2+7×4+10×2+4×1+7×2+10×1)/16=7

The difference calculation unit 4 generates difference values between the first and second images after the above filter calculations. The maximum value of these difference values becomes smaller than the case where filtering process is not performed. In this example, the maximum difference value is "5.3", which is smaller than the threshold. As a result, all pixels within this region is determined to be "0". That is, a difference image which does not have a movement region is obtained. In other words, the edge portion is not detected as movement region.

As described above, according to the first embodiment, the image conversion unit 3 performs a blurring process on the first and second images, and accordingly, differences along edge portions between the first and second images become smaller. Because of this, edge portions in the difference image are determined to be "non-movement regions". In other words, movement regions along edge portions are deleted or removed. Here, movement regions along edge portions are caused by camera shake. Accordingly, the above procedures eliminate the influence of camera shake so that movement regions based on object movements are detected.

As illustrated in FIG. 2, movement regions based on object movements may appear in portions other than along edge portions. Also, the magnitudes and directions of positional misalignment based on object movements between images are not uniform. Further, the magnitude of positional misalignment caused by object movement between images can be greater than that of misalignment caused by camera shake. Accordingly, even when the image conversion unit 3 performs the blurring process, the difference values obtained between the first and second images due to object movements are not suppressed uniformly. In other words, even when difference calculations and threshold decision are performed after blurring the first and second images, movement regions based on object movements remain.

The width of edge portions that can be deleted depends upon the width that is blurred by the image conversion unit 3. A blurring width is, in this example, adjusted by changing the size and the coefficients of the smoothing filter. In other words, when the width of a movement region appearing along an edge portion based on camera shake is expected to be large, the blurring width by the smoothing filter is adjusted to be great. Additionally, it is preferable that a blurring width is adjusted by shooting parameters of the camera or by external light for shooting images. For example, when the size of an image is large, the blurring width may be adjusted to be greater. Alternatively, when the external light for shooting images is weak, the blurring width may be adjusted to be smaller.

The threshold used to determine whether each pixel belongs to a movement region or a non-movement region is determined appropriately so that movement regions along edge regions are deleted while other movement regions are not deleted. This threshold is determined according to, for example, simulations, an actual measurement, or the like.

Further, it is also possible to perform, for example, filter calculations after reducing the size of the first and second images in order to reduce the amount of calculations. Image size reduction is implemented by lowering the resolutions of images although the scope of the invention is not limited to this manner.

FIG. 8 is a flowchart of another operation according to the first embodiment. In step S11, the image shooting unit 1 obtains first and second images by continuous shooting.

In step S21, the image conversion unit 3 performs image conversion on the first and second images to lower the resolutions. Resolution conversion is implemented by reducing each image using, for example, the bi-linear process. In step S22, the difference calculation unit 4 generates the difference image between the reduced first and second images. Further, in step S23, the difference calculation unit 4 executes steps S2 through S4 illustrated in FIG. 1 in order to extract a movement region from the difference image.

A movement region based on camera shake appears along an edge portion, and has a small area (or a small width). Accordingly, when the resolutions of the first and second images are lowered, a movement region based on camera shake becomes undetectable. By contrast, a movement region based on object movements corresponds to the size of that object, and does not become undetectable even when the resolutions of the first and second images are lowered. Accordingly, execution of steps S21 through S23 eliminates movement regions based on camera shake, and movement regions based on object movement are extracted. It is preferable that the rates of reducing images for lowering resolutions are determined in such a manner that movement regions along edge portions are eliminated or suppressed appropriately.

Second Embodiment

Figure 9:
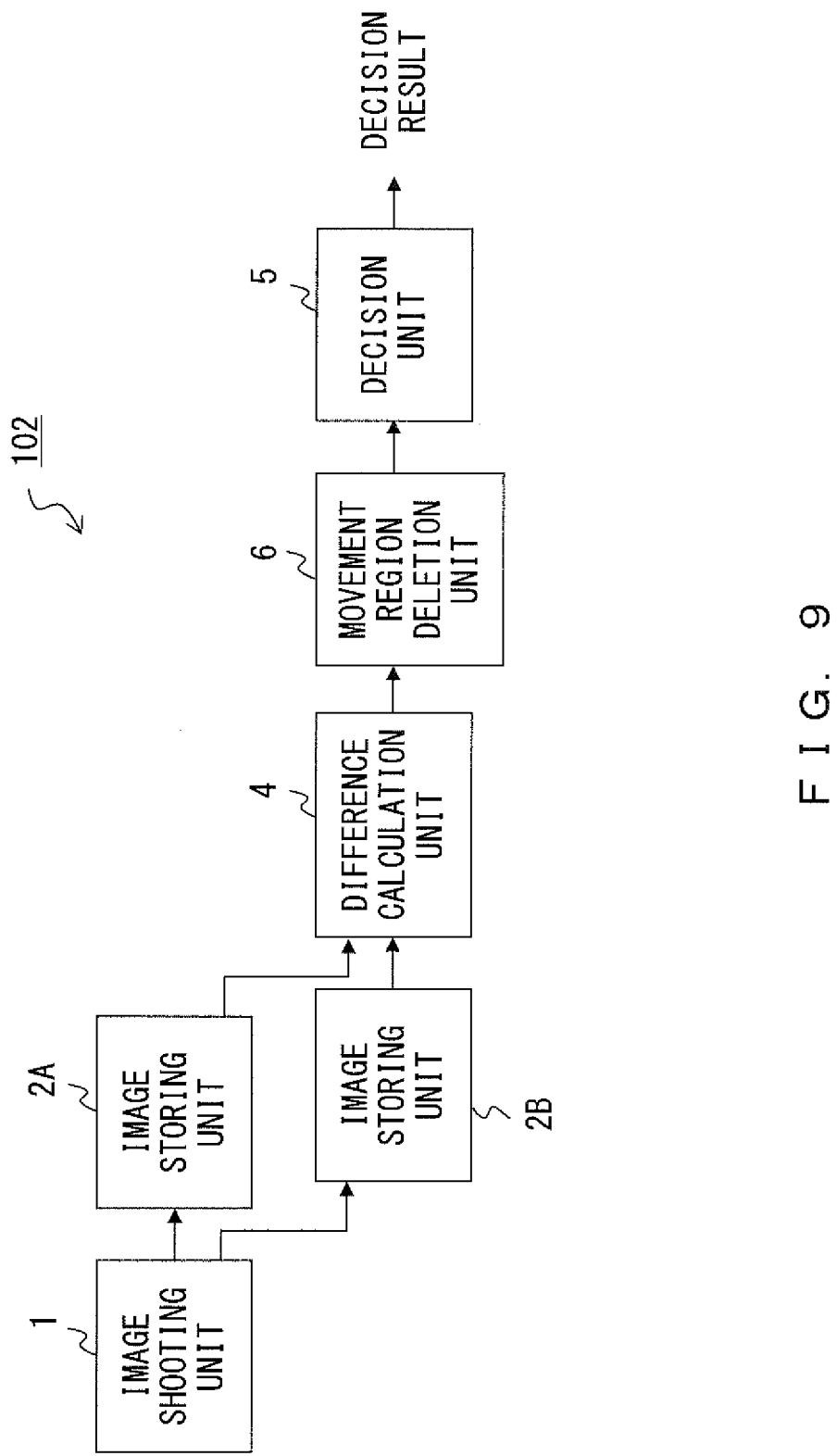
FIG. 9 illustrates a configuration of an object movement detection device according to a second embodiment.

FIG. 9 illustrates a configuration of an object movement detection device according to a second embodiment. An object movement detection device 102 according to the second embodiment includes the image shooting unit 1, the image storing units 2A and 2B, the difference calculation unit 4, the decision unit 5, and a movement region deletion unit 6. The object movement detection device 102 is implemented in, for example, a digital camera.

The configurations and functions of the image shooting unit 1, the image storing units 2A and 2B, the difference calculation unit 4, and the decision unit 5 are similar to those in the first embodiment. However, in the second embodiment, first and second images obtained by the image shooting unit 1 are stored in the image storing units 2A and 2B, and are input to the difference calculation unit 4 without being converted. The difference calculation unit 4 generates a difference image between the first and second images that have thus been input. That is, the difference calculation unit 4 generates the difference image from the first and second images. The difference value of each pixel in the difference image is compared with the threshold and binarized by the difference calculation unit 4. That is, difference calculation unit 4 generates the binarized difference image.

The movement region deletion unit 6 deletes or suppresses an outermost portion or a circumferential portion of the movement region extracted by the difference calculation unit 4. Hereinafter, the process performed by the movement region deletion unit 6 will be explained by referring to FIGS. 10A and 10B. Note that in FIGS. 10A and 10B, areas colored in black represent pixels determined to be "1: movement region", areas colored in white represent pixels determined to be "0: non-movement region", and shaded areas represent pixels that have been changed from "1: movement region" to "0: non-movement region" by the movement region deletion unit 6.

In FIG. 10A, a movement region as a line is obtained in the difference image. In this example, a straight line is obtained, however a curved line may also be obtained. The width of this movement region corresponds to "two pixel". As has already been described, a line movement region like this appears along an edge portion of an image mainly caused by camera shake. The movement region deletion unit 6 changes pixels in outermost portions of the movement region into "non-movement region". In other words, the movement region deletion unit 6 changes, from "1" to "0", the decision values of pixels adjacent to non-movement regions among pixels belonging to the movement regions. As a result of this, all movement regions in FIG. 10A are deleted. As described above, the movement region deletion unit 6 can delete movement regions caused by camera shake. Note that the above processes delete not only line movement regions but also other small movement regions.

In FIG. 10B, a movement region having lengths greater than several pixels both in the vertical and horizontal directions appears. As has been described, a movement region like this is generated by object movement. Similarly to the example illustrated in FIG. 10A, the movement region deletion unit 6 changes pixels in outermost portions of the movement region to "non-movement region". This process makes the movement region smaller, but does not delete all movement region. In other words, even after the movement region deletion unit 6 performs the delete process, the movement region based on object movement remains.

FIG. 9 is referred to again. The difference image in which a part of the movement region has been deleted by the movement region deletion unit 6 is input to the decision unit 5. The decision unit 5 calculates the area of the movement region (or the number of pixels in the movement region) in the difference image. Here, in the difference image output from the movement region deletion unit 6, the camera-shake-based movement region has been deleted. In other words, the movement region in the difference image output from the movement region deletion unit 6 is caused by object movements. Thus, the decision unit 5 can detect the degree of the object movement according to the movement region in the difference image output from the movement region deletion unit 6. That is, the decision unit 5 can detect the degree of the object movement according to the movement region in which a part of the region has been deleted by the movement region deletion unit 6.

The deleting operation by the movement region deletion unit 6 may be realized by a filter calculation. In this case, the movement region deletion unit 6 includes a filter.

FIG. 11 illustrates an example of a filter included in the movement region deletion unit 6. The filter included in the movement region deletion unit 6 is a circumference removing filter in this example. The filter is realized by 3×3 configuration in this example. However, the filter is not limited to this configuration, and may be, for example, realized by 5×5 configuration or the like.

The movement region deletion unit 6 performs a filter calculation on the binarized value of each pixel in the difference image. The filter calculation is as follows. Filtered pixel value R at coordinates (i,j) is calculated by the circumference removing filter as described below. $b_{i,j}$ represents binarized value at coordinates(i,j) in the difference image (input image of the circumference removing filter).

$$A = b_{i-1,j-1} + b_{i,j-1} + b_{i+1,j-1} + \\ b_{i-1,j} + 8b_{i,j} + b_{i+1,j} + b_{i-1,j+1} + b_{i,j+1} + b_{i+1,j+1}$$

Thereafter, the movement region deletion unit 6 compares filter calculation result A and a specified threshold Th for each pixel. If the calculation result A of a target pixel is equal to or greater than the threshold Th, the movement region deletion unit 6 outputs "1" as the decision value of that pixel, and if the calculation result A of a target pixel is smaller than the threshold Th, the movement region deletion unit 6 outputs "0" as the decision value of that pixel.

FIGS. 12A and 12B explain filter calculation and threshold decision performed by the movement region deletion unit 6. In FIG. 12A, a movement region as a line appears in the difference image obtained by the difference calculation unit 4. The difference image is binarized. In this example, "1" represents movement region and "0" represents non-movement region.

The movement region deletion unit 6 uses the circumference removing filter illustrated in FIG. 11 to perform filter calculations. For example, a filter calculation for pixel P3 is as follows:

$P3=0\times1+1\times1+1\times1+0\times1+1\times8+1\times1+0\times1+1\times1+1\times1=13$ Thereafter, the movement region deletion unit 6 compares the filter calculation result of each pixel and the threshold. In this example, the threshold is "14". In this case, the decision values of all the pixels are "0" in the example in FIG. 12A. In other words, the line movement region is deleted by the movement region deletion unit 6.

In FIG. 12B, similarly to FIG. 10B, continuous movement region that include several pixels in the vertical and horizontal directions appears. In this case, the filtered pixel values at circumferential portion of the movement region are smaller than the threshold. Thus, the decision values at circumferential portion of the movement region are "0". As a result, the circumferential portions of the movement region are deleted, and the size of the movement region becomes smaller. However, in the lower right portion of the image, the filtered pixel values are larger than the threshold. Thus, the movement region remains in the lower right portion of the image.

According to the above process, not only line movement regions and small movement regions are deleted, but outermost portions of large movement regions caused by object movements are also deleted. Accordingly, the movement region deletion unit 6 may execute a region expansion process after the above described region deletion process. The region expansion process is implemented by, for example, changing the decision values of pixels adjacent to the circumferential line of a movement region from "0: non-movement region" to "1: movement region".

When the region expansion process is executed, movement regions deleted in FIG. 12B are reproduced. In other words, the movement regions caused by object movements are restored to the state before the execution of the process by the movement region deletion unit 6. By contrast, in the example illustrated in FIG. 12A, no movement regions remain after the execution of the region deletion process. Accordingly, even when the region expansion process is executed, movement regions are not reproduced. This means that movement regions caused by camera shake are not reproduced.

The region expansion process is implemented by performing a filter calculation using the same or similar filter as that used in the region deletion process. However, the filter calculation value of each pixel is compared with a threshold value smaller than that used in the region deletion process. For example, when a filter illustrated in FIG. 11 is used in the region expansion process, the threshold may be set to "0".

In the above example, movement regions are changed into non-movement regions for one-pixel wide along outermost portions or circumferential portions of movement regions. However, it is also possible to change movement regions into non-movement regions for N-pixels wide (N is an integer equal to or greater than 2) along outermost portions or circumferential portions of movement regions. In order to change movement regions into non-movement regions for N-pixels wide, the above described filter calculations may be executed repeatedly or a larger filter may be used, for example. The width of regions to be changed from movement regions into non-movement regions is determined in accordance with, for example, the magnitude of camera shake that is assumed. When a region has been deleted N-pixels wide in the region deletion process, it is preferable that regions are expanded N-pixels wide in the region expansion process.

Figure 13:
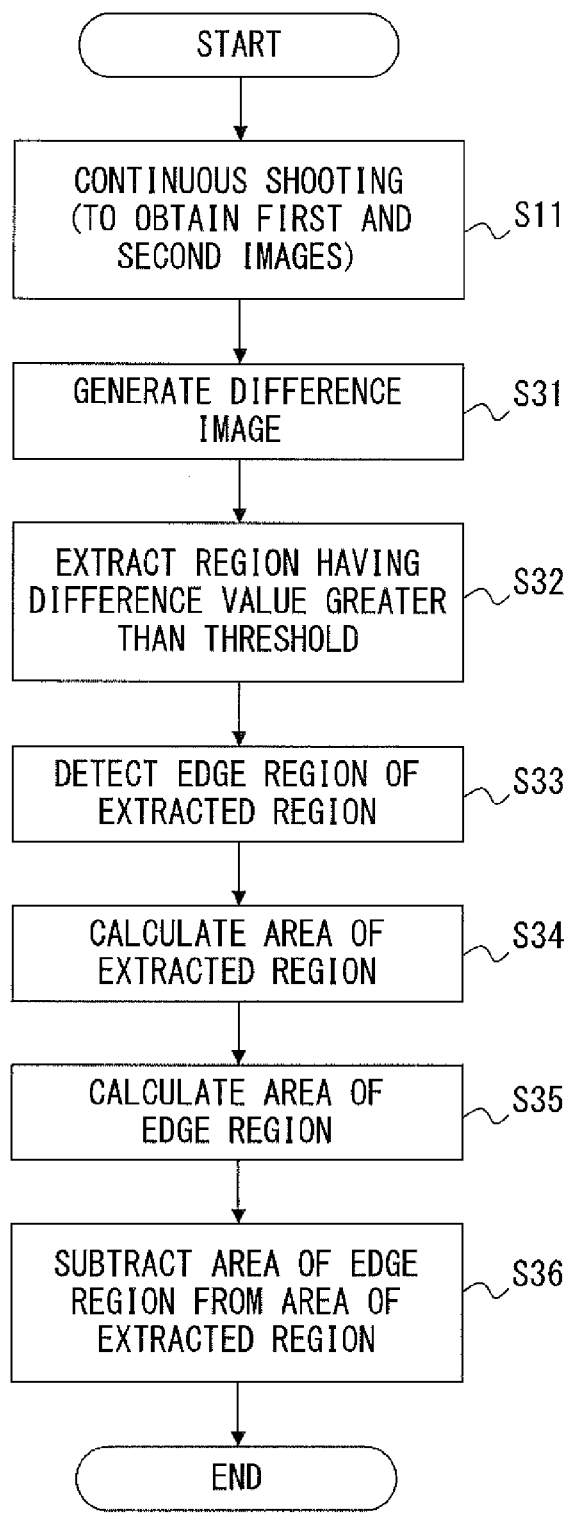
FIG. 13 is a flowchart explaining another operation performed in a second embodiment.

FIG. 13 is a flowchart explaining another operation performed in the second embodiment. In step S11, the image shooting unit 1 obtains the first and second images by continuous shooting.

Steps S31 and S32 are similar to those in the above described example. That is, the difference calculation unit 4 generates a difference image between the first and second images, and extracts regions (or pixels) having difference values greater than the threshold in the difference image. Extracted regions are movement regions, and include movement regions caused by camera shake and movement regions caused by object movement.

In step S33, the movement region deletion unit 6 detects an edge of the movement region extracted from the difference image. An edge is detected by using, for example, a Laplacian filter or a Sobel filter. In step S34, the movement region deletion unit 6 calculates the area of the movement region extracted from the difference image in step S32. In step S35, the movement region deletion unit 6 calculates the area of the edge region detected in step S33. Thereafter, in step S36, the area of the edge region is subtracted from the area of the movement region.

In the above process, the area of an edge region corresponds to that of a movement region caused by camera shake. Accordingly, the calculation result in step S36 corresponds to the area of the movement region caused by object movement. Thereafter, the decision unit 5 determines the degree of object movement in accordance with the area calculated in step S36.

FIG. 14 illustrates an example of a filter used in the procedures explained in FIG. 13. In those procedures, the movement region deletion unit 6 is configured to include an edge detection filter (the filter is a 3×3 Laplacian filter in this example).

The movement region deletion unit 6 performs a filter calculation using the Laplacian filter on the difference image generated by the difference calculation unit 4. Filtered pixel value $k_{i,j}$ at coordinates(i,j) is calculated by the Laplacian filter as described below. $a_{i,j}$ represents pixel value at coordinates(i,j) in the difference image (input image of the Laplacian filter).

$$k_{i,j} = a_{i-1,j-1} + a_{i,j-1} + a_{i+1,j-1} +$$
$$a_{i-1,j} - 8a_{i,j} + a_{i+1,j} + a_{i-1,j+1} + a_{i,j+1} + a_{i+1,j+1}$$

The filter calculation detects an edge in the difference image. Then, the movement region deletion unit 6 calculates the area of the detected edge region (or the number of pixels belonging to the edge region).

Figure 15:
FIG. 15 explains procedures illustrated in FIG. 13.

FIG. 15 explains procedures illustrated in FIG. 13. In this example, a difference image generated by the difference calculation unit 4 is input to the movement region deletion unit 6. Here, the difference image is not binarized. That is to say, the pixel value of each pixel of the difference image is a difference between pixel values of corresponding pixels of the first and second images.

The movement region deletion unit 6 executes a filter calculation on the difference value of each pixel in the difference image. Then the movement region deletion unit 6 compares the filter calculation result of each pixel and a specified threshold. The pixel whose filtered value is larger than the threshold is determined to belong to edge region. In this example, an edge region extending in the vertical direction with a width of two-pixel wide is detected. In this case, the area of the edge region is 12 pixels.

As has been described above, in the second embodiment, a movement region is detected in the difference image between the first and second images, and an edge region is deleted from the detected movement region. This deletion process may be realized by subtracting the area of the edge region from the area of the movement region. Then, the degree of the object movement is detected in accordance with the area of the movement region from which the edge region has been deleted.

Figure 16:
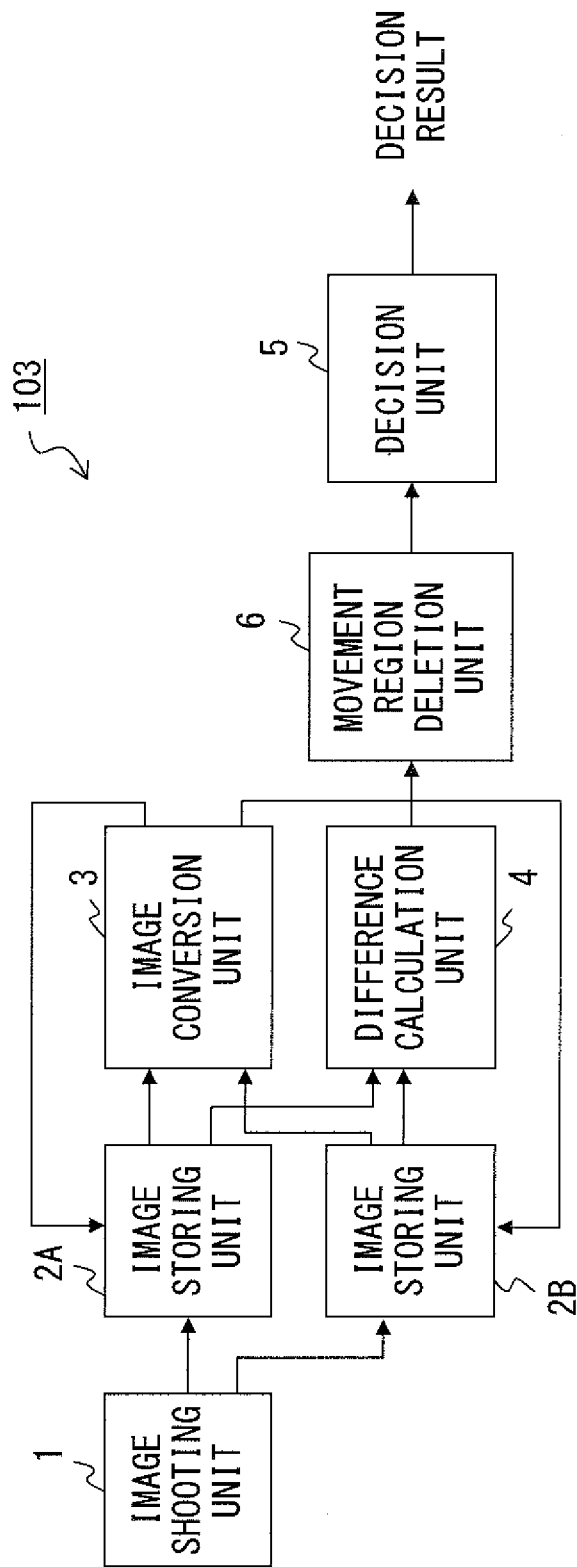
FIG. 16 illustrates a variation example of the object movement detection device according to the second embodiment.

FIG. 16 illustrates a variation example of the object movement detection device according to the second embodiment. This object movement detection device 103 includes the image shooting unit 1, the image storing units 2A and 2B, the image conversion unit 3, the difference calculation unit 4, the decision unit 5, and the movement region deletion unit 6.

In the object movement detection device 103, the difference image obtained by the difference calculation unit 4 is similar to that in the first embodiment. Accordingly, it is expected that an edge region has been deleted from a movement region in the difference image output from the difference calculation unit 4. However, an edge region sometimes remains in the difference image output from the difference calculation unit 4. Thus, the object movement detection device 103 includes the movement region deletion unit 6 on the output side of the difference calculation unit 4.

The movement region deletion unit 6 in FIG. 6 has substantially the same function as that explained by referring to FIGS. 10 through 15. That is, the movement region deletion unit 6 subtracts the area of an edge region from the area of a movement region. Accordingly, the object movement detection device 103 makes it possible to calculate the area of a movement region caused by object movement more precisely than the configuration illustrated in FIG. 4 or FIG. 9.

Third Embodiment

Figure 17:
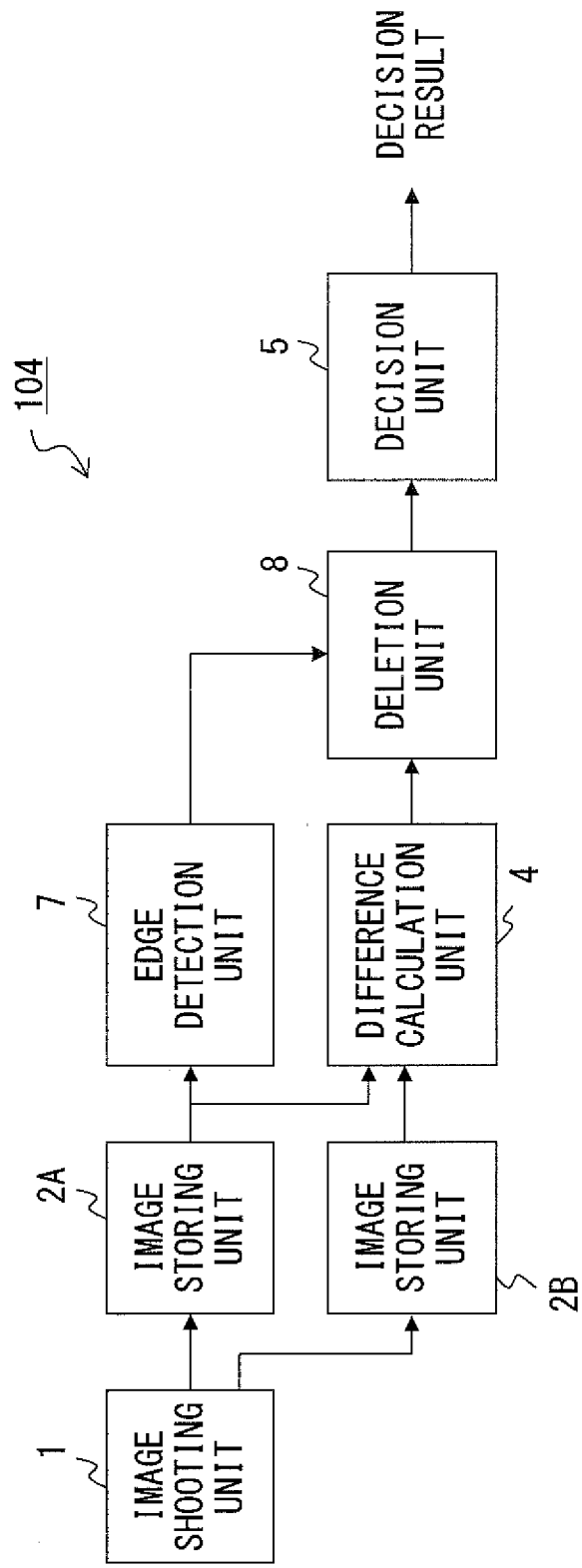
FIG. 17 illustrates a configuration of an object movement detection device according to a third embodiment.

FIG. 17 illustrates a configuration of an object movement detection device according to a third embodiment. An object movement detection device 104 according to the third embodiment includes the image shooting unit 1, the image storing units 2A and 2B, the difference calculation unit 4, the decision unit 5, an edge detection unit 7, and a deletion unit 8. The object movement detection device 104 is implemented in, for example, a digital camera.

The edge detection unit 7 detects an edge in the original image. In this description, the original image is an input image from the image shooting unit 1. In this example, an edge is detected in the first image stored in the image storing unit 2A. The edge detection unit 7 is implemented by, for example, a Sobel filter or a Laplacian filter illustrated in FIG. 14. Note that the edge detection unit 7 may detect an edge in the second image stored in the image storing unit 2B. That is to say, the edge detection unit 7 may detect an edge in formerly obtained image among the two images stored in the image storing units 2A and 2B, and may detect an edge in latterly obtained image among the two images stored in the image storing units 2A and 2B.

The deletion unit 8 deletes an edge region detected by the edge detection unit 7 from a movement region extracted by the difference calculation unit 4. In this example, the edge region corresponds to the movement region caused by camera shake, as has been described. Accordingly, regions obtained by the deletion unit 8 correspond to movement regions caused by object movements. In other words, the movement region in which a part of the region (that is, edge region) is deleted by the deletion unit 8 corresponds to the movement region caused by object movement.

The functions of the decision unit 5 are similar to those in the first or second embodiment. That is, the decision unit 5 detects the degree of object movement in accordance with the area of the movement region (or the number of pixels belonging to the movement region) obtained by the deletion unit 8. In this case, the decision unit 5 may determine the degree of the object movement in accordance with a ratio between an area of the movement region in which a part of the region is deleted by the deletion unit 8 and an area of the first image.

Figure 18:
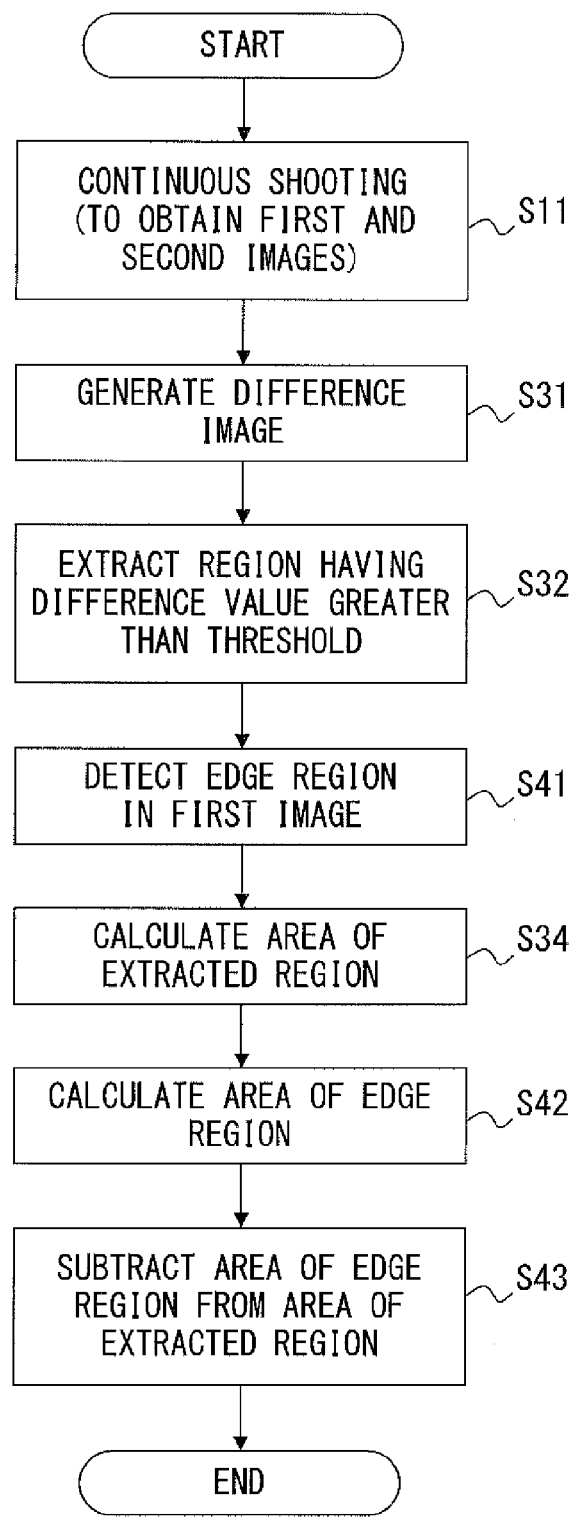
FIG. 18 is a flowchart illustrating a detection method according to the third embodiment.

FIG. 18 is a flowchart illustrating a detection method according to the third embodiment. The detection method according to the third embodiment is similar to that illustrated in FIG. 13. However, in the third embodiment, the edge detection unit 7 detects an edge in the original image (the first image in the example) in step S41. In step S42, the area of the edge region detected in the first image is calculated. In step S43, the deletion unit 8 subtracts the area of the edge region detected in the first image from the area of the movement region. Then the decision unit 5 determines the degree of the object movement according to the area calculated in step S43.

<Functions Common to First Through Third Embodiments>

In FIGS. 4, 9, 16, and 17, the image shooting unit 1 generates digital images continuously at specified time intervals. Generated digital images are input to the image storing units 2A and 2B alternately. The object movement detection device can always detect movements of an object by utilizing the latest two digital images. That is, when the first and second images are input, a movement of the object is detected utilizing those two images. Next, when a third image is input, the first image stored in the image storing unit 2A is discarded, and the third image is written to the image storing unit 2A. Thereafter, the second and third images are used so as to detect a movement of the object. Thereafter, this process is executed repeatedly.

The above described repetitive process is executed, for example, in preliminary shooting. For example, while the shutter button is not pushed by the user of a camera, the latest movements of the object are always monitored. In this case, the degree of the object movements immediately before the actual shooting is detected. Accordingly, it is possible to shoot images with appropriate shooting parameters (exposure time, for example) according to object movements immediately before the actual shooting.

Although the object movement detection device includes the image shooting unit 1 and the image storing units 2A and 2B in the above example, the scope of the invention is not limited to this configuration. That is, the object movement detection device according to the invention may employ a configuration in which a plurality of digital images obtained by continuous shooting are input, and object movement is detected by using those digital images.

<Implementations>

FIG. 19 illustrates a configuration of an object shake suppression device according to an embodiment. This object shake suppression device is implemented by adding a parameter changing unit 11, a parameter setting unit 12, and a parameter table 13 to the object movement detection device according to the first, second, or third embodiment. In FIG. 19, the object movement detection device illustrated in FIG. 16 is used.

The decision unit 5 detects the degree of movement of an object, as has been described in the first through third embodiments. In this example, the ratio between the area of the image frame and the area of a movement region caused by object movement is calculated. The decision unit 5 reports the calculation result to the parameter changing unit 11.

When the ratio of the area of a movement region caused by object movement exceeds a specified threshold (for example, 20 percent), the parameter changing unit 11 transmits to the parameter setting unit 12 an instruction to reduce an exposure time. When the parameter setting unit 12 receives an instruction to shoot an image from the user of the camera (for example, when the shutter button is pushed), the parameter setting unit 12 obtains a parameter for a short time exposure from the parameter table 13 if the instruction to reduce the exposure time is received from the parameter changing unit 11. Thereafter, the parameter setting unit 12 sets the obtained parameter in the image shooting unit 1. In this case, the image shooting unit 1 obtains digital image under short exposure time.

When the ratio of a movement region caused by object movement is equal to or lower than the threshold, the parameter changing unit 11 does not transmit the instruction to the parameter setting unit 12. In such a case, when the parameter setting unit 12 receives an instruction to shoot an image from the user of the camera, the parameter setting unit 12 obtains a parameter for normal image shooting from the parameter table 13. Thereafter, the parameter setting unit 12 sets the obtained parameter in the image shooting unit 1. In this case, the image shooting unit 1 obtains digital image with normal exposure time.

The image shooting unit 1 uses the parameter set by the parameter setting unit 12, and generates one or a plurality of digital images. That is, when the degree of object movement is determined to be high in the preliminary shooting, image shooting is performed with a short time exposure for shooting images that are actually to be stored. The decision using the preliminary shooting is performed immediately before the actual shooting. Accordingly, even when the object is moving, images with suppressed object shake can be obtained. Also, when the degree of movement of an object is determined to be low in the preliminary shooting, images are shot normally (with normal exposure time). Note that parameters for normal shooting are selected in accordance with brightness at the time of shooting and with the shooting mode (shutter-priority mode, automatic mode, sport mode, or the like).

Figure 20:
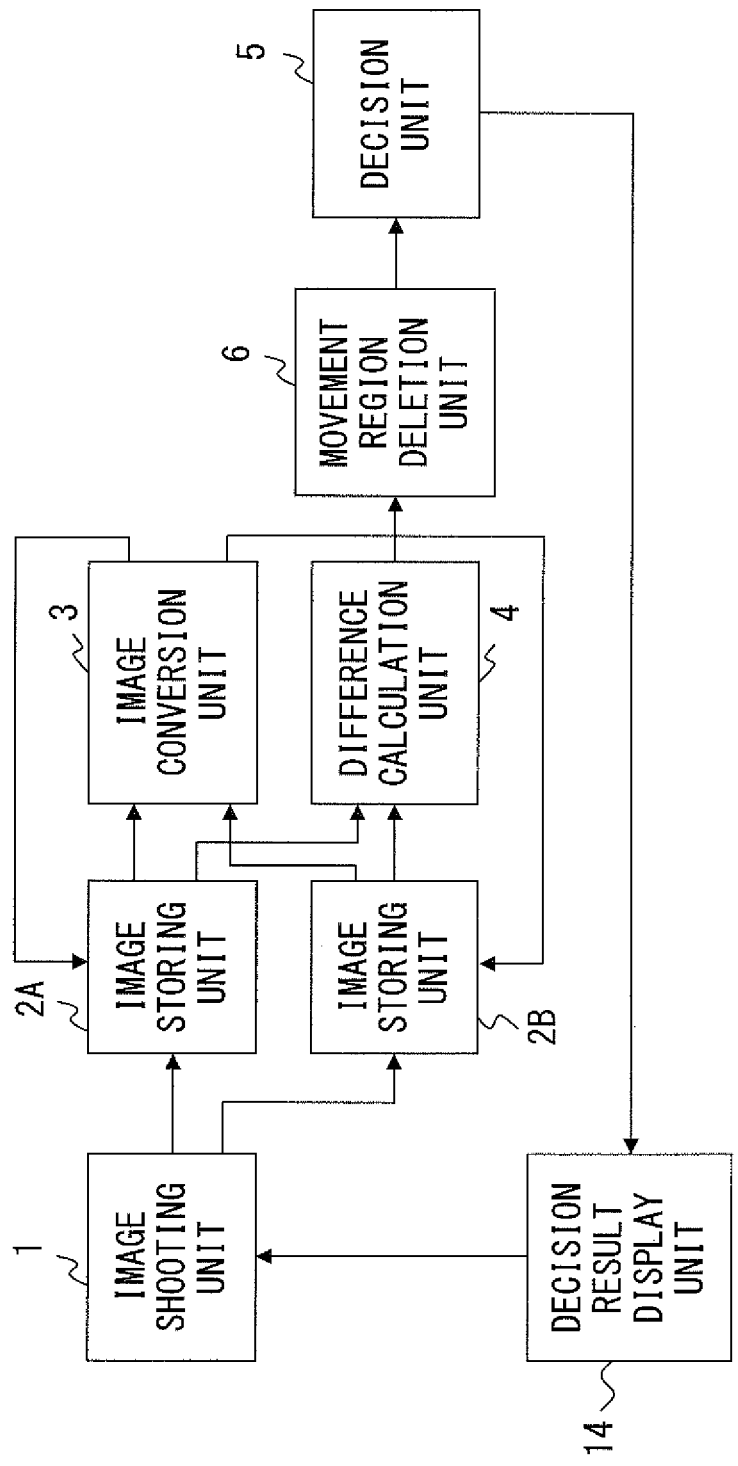
FIG. 20 illustrates a configuration of an object shake reporting device according to an embodiment.

FIG. 20 illustrates a configuration of an object shake reporting device according to an embodiment. This object shake reporting device is implemented by adding a decision result display unit 14 to the above first, second or third embodiment. In FIG. 20, the object movement detection device illustrated in FIG. 16 is used.

The decision unit 5 calculates the degree of object movement as has been described. The decision unit 5 reports the result of this calculation to the decision result display unit 14. The decision result display unit 14 is a display device included in the camera (a finder, a liquid crystal viewer, or the like), and displays information indicating that the object is moving in response to reports from the decision unit 5. Introducing this configuration makes it possible for users to recognize the degree of object movement when shooting images. Although the result of decision of object movements is displayed in the example illustrated in FIG. 20, other methods (using audio for example) may be used to output the result.

<Hardware Configuration>

Figure 21:
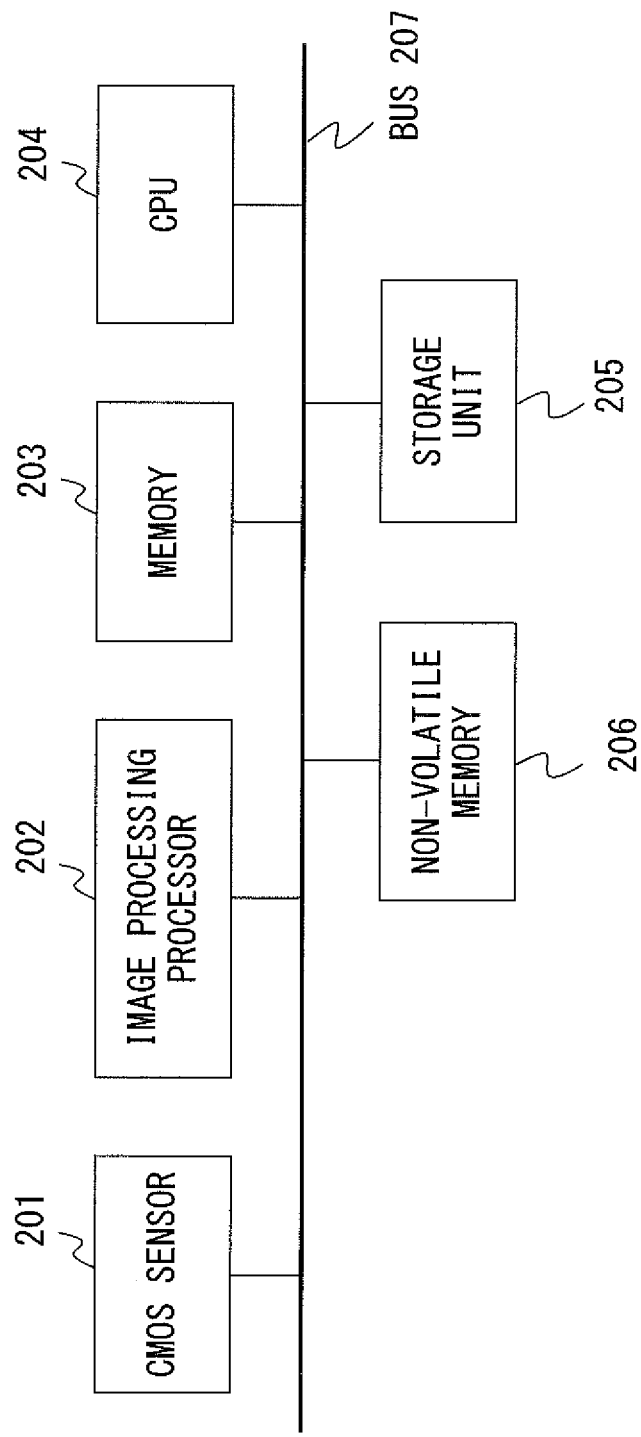
FIG. 21 illustrates a hardware configuration that realizes an object movement detection device according to an embodiment.

FIG. 21 illustrates a hardware configuration that realizes the object movement detection device according to the embodiments. The object movement detection device according to the embodiments is included in a digital camera.

The CMOS sensor 201 obtains a digital image. An image processing processor 202 sets shooting parameters such as exposure time for the CMOS sensor 201, or the like, and controls obtainment of images from the CMOS sensor 201. The memory 203 temporarily stores image data obtained from the CMOS sensor 201, and an image processing program executed by the CPU 204. The CPU 204 executes the image processing program in the memory 203 to control the image processing processor 202, to convert image data, and to perform other processes. A storage unit 205 is, for example, a removable flash memory, and stores digital images obtained by the CMOS sensor 201. Non-volatile memory 206 is, for example, flash memory implemented in the digital camera, and stores various parameters defining operations of the camera, and current setting values. A bus 207 connects the above circuit elements 201 through 206 to each other.

The image shooting unit 1 illustrated in FIGS. 4, 9, 16, and 17 is implemented using the CMOS sensor 201 and the image processing processor 202. That is, the image processing processor 202 controls the CMOS censor 202, and thereby digital images are obtained. The image storing units 2A and 2B are implemented by, for example, the memory 203.

The image conversion unit 3, the difference calculation unit 4, the decision unit 5, and the movement region deletion unit 6 are implemented by executing the image processing program using the CPU 204. In other words, the CPU 204 performs, on image data stored in the memory 203, an image conversion process (a blurring process, a filter calculation, or the like) by using software. Filter coefficients and the like are stored in, for example, the non-volatile memory 206. The CPU 204 performs the process of calculating the difference between the two latest digital images stored in the memory 203. In accordance with embodiments, the difference between images obtained by the CMOS sensor 201 or the difference between converted images is calculated. The CPU 204 further compares the calculated difference value and the threshold so as to determine the degree of object movement.

The parameter changing unit 11 and the parameter setting unit 12 illustrated in FIG. 19 are implemented by executing the camera control program using the CPU 204. The parameter table 13 is stored in, for example, the non-volatile memory 206.

Examples of the ways in which the image processing program (object movement detection program) according to the embodiments is provided are given below.

(1) The program is installed in advance in the non-volatile memory 206.

(2) The program is provided through a removable memory device.

(3) The program is downloaded from a program server.

Although the image processes including the object movement detection process are implemented in the form of a software program in the example above, the invention is not limited to this configuration. In other words, part of the above described functions may be implemented in the form of a hardware circuit.

Effects or Advantages of Embodiments

In the configurations or methods according to the embodiments, attention is focused on the fact that image deterioration caused by camera shake occurs along edge portions, and object movement is detected by removing a movement region in the vicinity of edge portions. Accordingly, it is possible to detect an object movement by image processing such as a filter calculation or the like, which requires a smaller number of calculations, without using an expensive optical mechanism for camera shake correction or without performing image alignment, which requires a great number of calculations. Thus, it is possible to monitor object movement in real time using an inexpensive configuration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has(have) been described in detail, it should be understood that the various changes, substitutions, and alterations could be made hereto without departing from the spirit and scope of the invention.

What is claimed is:

1. A device for detecting a movement of an object, comprising:
    an image shooting unit configured to generate a first image and a second image by continuous shooting;
    a detection unit configured to detect a movement region based on a difference between the first and second images;
    an edge detection unit configured to detect an edge region in the first image;
    a first calculator configured to calculate an area of the movement region detected by the detection unit;
    a second calculator configured to calculate an area of the edge region detected by the edge detection unit;
    a third calculator configured to calculate a difference between the area of the movement region and the area of the edge region; and
    a decision unit configured to determine a degree of object movement in accordance with the difference between the area of the movement region and the area of the edge region.

2. A device for detecting a movement of an object comprising:
    an image shooting unit configured to generate a first image and a second image by continuous shooting;
    a detection unit configured to detect a movement region based on a difference between the first and second images;
    an edge detection unit configured to detect an edge region in the first image;
    a deletion unit configured to delete the edge region from the movement region; and
    a decision unit configured to determine a degree of the object movement in accordance with a ratio between an area of the movement region in which a part of the movement region is deleted by the deletion unit and an area of the first image.

3. The device for detecting a movement of an object according to claim 1, further comprising a parameter changing unit configured to control a shooting parameter used by the image shooting unit in accordance with the degree of the object movement determined by the decision unit.

4. A device for detecting a movement of an object, comprising:
    an image shooting unit configured to generate a first image and a second image by continuous shooting;
    a detection unit configured to generate a difference image which represents a difference between the first and second images and to detect a movement region in the difference image;
    an edge detection unit configured to detect an edge region in the difference image;
    a first calculator configured to calculate an area of the movement region detected by the detection unit;
    a second calculator configured to calculate an area of the edge region detected by the edge detection unit;
    a third calculator configured to calculate a difference between the area of the movement region and the area of the edge region; and
    a decision unit configured to determine a degree of object movement in accordance with the difference between the area of the movement region and the area of the edge region.

5. A non-transitory computer readable medium for storing a computer program which enables a computer to perform a method of detecting a movement of an object using first and second images obtained by continuous shooting, the method comprising:
    detecting a movement region based on a difference between the first and second images;
    detecting an edge region in the first image;
    calculating an area of the movement region;
    calculating an area of the edge region;
    calculating a difference between the area of the movement region and the area of the edge region; and
    determining a degree of object movement in accordance with the difference between the area of the movement region and the area of the edge region.

6. A non-transitory computer readable medium for storing a computer program which enables a computer to perform a method of detecting a movement of an object using first and second images obtained by continuous shooting, the method comprising:
    detecting a movement region based on a difference between the first and second images;
    detecting an edge region in the first image;
    deleting the edge region from the movement region; and
    determining a degree of the object movement in accordance with a ratio between an area of the movement region in which a part of the movement region is deleted and an area of the first image.

7. The non-transitory computer readable medium according to claim 5, the method further comprising controlling a shooting parameter used in the image shooting in accordance with the degree of the object movement.

* * * * *